United States Patent
Vallala et al.

(10) Patent No.: US 9,521,010 B2
(45) Date of Patent: Dec. 13, 2016

(54) DIAGNOSING AND REPORTING A NETWORK BREAK

(75) Inventors: Vijay Vallala, North Andover, MA (US); Alen Mehmedagic, Wilmington, MA (US); Mark Quealy, Chelmsford, MA (US)

(73) Assignee: Schneider Electric Industries SAS, Rueil Malmaison (FR)

( * ) Notice: Subject to any disclaimer, the term of this patent is extended or adjusted under 35 U.S.C. 154(b) by 106 days.

(21) Appl. No.: 14/387,585

(22) PCT Filed: Apr. 5, 2012

(86) PCT No.: PCT/US2012/032369
§ 371 (c)(1),
(2), (4) Date: Sep. 24, 2014

(87) PCT Pub. No.: WO2013/151550
PCT Pub. Date: Oct. 10, 2013

(65) Prior Publication Data
US 2015/0304126 A1    Oct. 22, 2015

(51) Int. Cl.
*H04L 12/44* (2006.01)
*H04L 12/18* (2006.01)
*H04L 12/24* (2006.01)

(52) U.S. Cl.
CPC ............. *H04L 12/44* (2013.01); *H04L 12/18* (2013.01); *H04L 41/0803* (2013.01)

(58) Field of Classification Search
CPC ........ H04L 12/44; H04L 12/18; H04L 41/0803
See application file for complete search history.

(56) References Cited

U.S. PATENT DOCUMENTS

| 6,373,826 B1 | 4/2002 | Russell et al. |
| 7,593,319 B1 * | 9/2009 | Sivasankaran ........ H04L 12/462 370/216 |
| 8,737,198 B1 * | 5/2014 | Holness ................. H04L 45/28 370/222 |

(Continued)

FOREIGN PATENT DOCUMENTS

WO    03/077459 A2    9/2003

OTHER PUBLICATIONS

International Search Report and Written Opinion mailed Dec. 4, 2012(PCT/US2012/032369); ISA/EP.

*Primary Examiner* — Albert T Chou
(74) *Attorney, Agent, or Firm* — Banner & Witcoff, Ltd.

(57) ABSTRACT

A system, method, and computer readable medium allow a cable break or other network link failure to be detected and reported. The method may include steps of periodically transmitting a packet from a root node in the network to a next node in the network; at each successive non-root node in the loop, manipulating the packet and forwarding the manipulated packet to a next successive node in the loop; when the packet is received back at the root node within a predetermined time period, reporting that the loop is intact; and when the packet is not received back at the root node within the predetermine time period, reporting that a network break has occurred. The network may conform to the STP or RSTP protocols, and may contain one or more rings possibly including dual rings. The PLC may operate as the root node, and the reporting may be done at an application level in the PLC.

19 Claims, 5 Drawing Sheets

(56) References Cited

U.S. PATENT DOCUMENTS

| | | | |
|---|---|---|---|
| 2003/0165119 A1* | 9/2003 | Hsu | H04L 12/437 370/258 |
| 2004/0081083 A1* | 4/2004 | Sekihata | H04L 12/42 370/222 |
| 2008/0101219 A1* | 5/2008 | Rose | H04L 12/42 370/224 |
| 2010/0226260 A1 | 9/2010 | Zinjuvadia et al. | |

* cited by examiner

| MAC destination address | | | | | | MAC source address | | | | | |
|---|---|---|---|---|---|---|---|---|---|---|---|
| 01 | 80 | 63 | 07 | 00 | 0A | XX | XX | XX | XX | XX | XX |
| length | | DSAP | SSAP | CTRL | OUI | | | type | | | |
| 00 | 42 | AA | AA | 03 | 00 | 00 | 00 | 80 | 63 | | |
| ViHL | TOS | Total length | | ID | | Flag & offset | | TTL | Prot | Checksum | |
| 45 | FC | 00 | 3A | 00 | 00 | 00 | 00 | 01 | 11 | 00 | 00 |
| Source Address | | | | Destination Address | | | | | | | |
| 00 | 00 | 00 | 00 | 00 | 00 | 00 | 00 | | | | |
| Src Port | | Dest Port | | Length | | Checksum | | | | | |
| 00 | 00 | 00 | 00 | 00 | 26 | 00 | FF | | | | |
| VID | Type | Role | FS | Life | Flag | Domain id | | | | | |
| 03 | 05 | 00 | 00 | 05 | 00 | 00 | 00 | | | | |
| SP | | PartnerMAC | | SequenceID | | PP | TRV | VF | HostMAC | | |
| 00 | 00 | 00 | 00 | 00 | 00 | 00 | 00 | XX | XX | XX | XX |
| HostMAC | | | | | | Link | Reserved | | | | |
| XX | XX | XX | XX | XX | XX | 00 | 00 | 00 | 00 | | |

FIG. 4

DIAGNOSING AND REPORTING A NETWORK BREAK

CROSS-REFERENCE TO RELATED APPLICATIONS

The present application is a U.S. National Phase filing of and claims priority to International Application No. PCT/US2012/032369, filed on Apr. 5, 2012, which is incorporated by reference herein in its entirety.

BACKGROUND

Industrial automation systems often include a Programmable Logic Controller (PLC) coupled to other devices, such as remote I/O devices, over one or more communication networks. In a factory or other industrial setting, such networks may include dozens of sensors that constantly monitor such things as temperatures, fluid levels, or robotic arm positions. The sensors may be coupled to I/O devices that report back to the PLC many times per second. The PLC may include rules for acting on the changing conditions, such as issuing commands to other devices over the network to perform various operations in the system. The PLC may also monitor and report on the status of various operating parameters and errors detected in the system.

As shown in FIG. 1, a user console 101 is coupled to a programmable logic controller (PLC) 102. Console 101 may comprise one or more processors and memory storing application software and/or a user interface that allows a user or a computer program to configure, alter, control, and monitor the operation of functions in PLC 102 and a network in which the PLC operates. PLC 102 may comprise any of various types of commercially available PLCs, such as the Modicon™ Quantum™ PLC available from Schneider Electric, Inc.

PLC 102 may be coupled to one or more communication controllers 103 and 104 through a backplane interconnection or other means. Each communication controller handles communication with one or more remote I/O devices, such as devices 105, 106, and 107, over one or more networks 108 and 109, for the purpose of monitoring and controlling various devices and sensors in the system.

Industrial Ethernet is one type of network used in industrial automation systems to communicate among nodes. A network such as Industrial Ethernet may be configured into one or more rings that are configured and communicate according to Spanning Tree Protocol (STP) or Rapid Spanning Tree Protocol (RSTP). STP is a network protocol that prevents bridge loops (cycles) and the ensuing broadcast radiation (i.e., packets that are transmitted forever endlessly in the network). It also allows a network to include redundant links to provide automatic backup paths if a link fails, without the danger of creating loops that could lead to redundant broadcast messages.

STP creates a spanning tree within a mesh network of devices and disables any links (blocks ports) between nodes that are not part of the spanning tree, leaving only a single active path between any two network nodes. One node is selected as a root node based on its bridge ID. Other nodes are configured to determine and use the shortest path to the root node. Upon detecting a link failure, the protocol computes and creates a new shortest-path tree structure (e.g., by activating blocked ports), and the network automatically reconfigures itself to work around the failed link or node. STP is standardized as IEEE 802.1D.

RSTP is an improved version of STP, standardized as IEEE 802.1w, that is able to respond to changes more quickly than STP. Other variations and modifications of STP have also been proposed.

It would be desirable to provide improved detection and reporting, particularly at an application level in a PLC, of a detected cable break or other network failure in a network such as an RSTP ring of devices.

SUMMARY

Described herein are a system, method, and computer readable medium for detecting a cable break or other link failure in a network, such as an Industrial Ethernet network. The method may include steps of periodically transmitting a packet from a root node in the network to a next node in the network; at each successive non-root node in the loop, manipulating the packet and forwarding the manipulated packet to a next successive node in the loop; when the packet is received back at the root node within a predetermined time period, reporting that the loop is intact; and when the packet is not received back at the root node within the predetermine time period, reporting that a network break has occurred. The network may conform to the STP or RSTP protocols, and may contain one or more rings possibly including dual rings. In some variations, the PLC may operate as the root node, and the reporting may be done at an application level in the PLC. In some variations, the packet may be transmitted as a multi-cast packet in the network. The packet may be handled differently when it is sent over a blocked port.

Also described herein is a system including a plurality of network nodes configured into a spanning tree topology. A root node in the system may periodically transmit a packet to a next node in the network. Each successive non-root node in the system may manipulate the packet and forward the manipulated packet to a next successive node. When the packet is received back at the root node within a predetermined time period, a report or other indicator may be generated to indicate that the network is intact. When the packet is not received back at the root node within a predetermined time period, a loop break message or indicator may be generated. The network may conform to the STP or RSTP protocols, and may contain one or more rings possibly including dual rings. In some variations, the packet may be transmitted as a multi-cast packet in the network. The packet may be handled differently when it is sent over a blocked port.

Also described herein is a computer-readable medium, such as a memory device, including executable instructions that, when executed, perform functions relating to the method and system described above.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein:

FIG. 4 shows one possible frame format for a loop check message.

DETAILED DESCRIPTION

Figure 1:
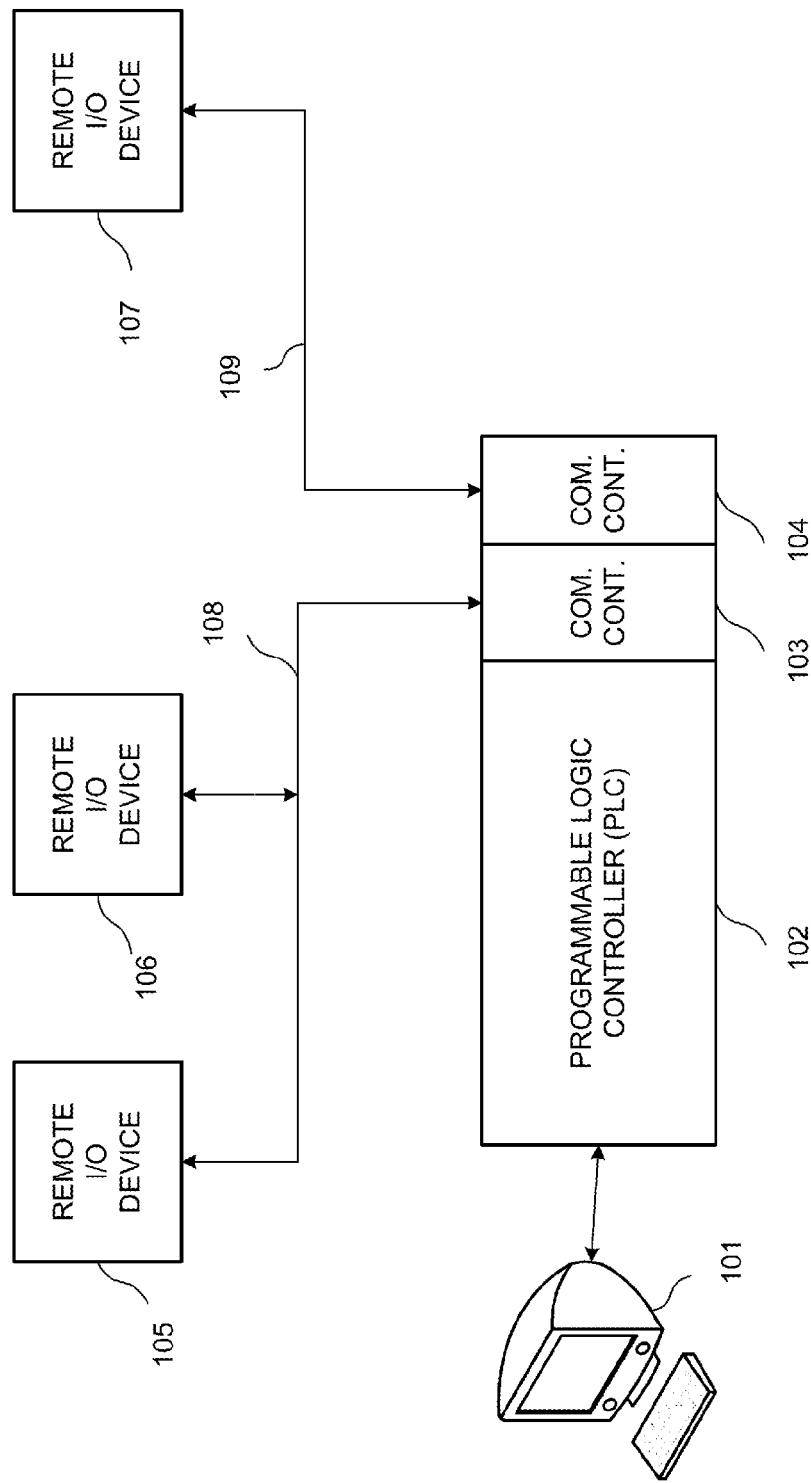
FIG. 1 is a block diagram of an industrial automation system including a PLC and various network elements.
Figure 2:
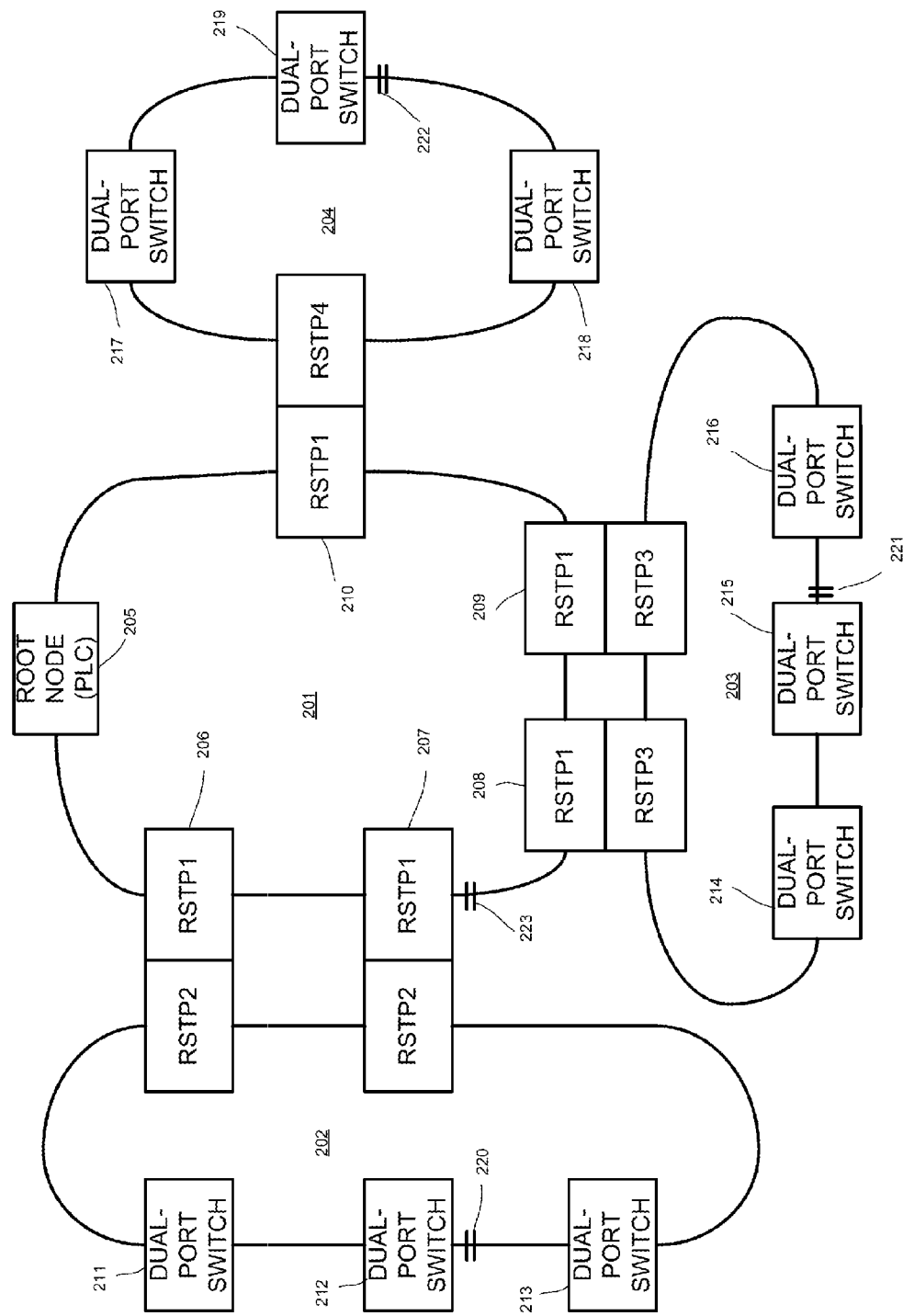
FIG. 2 is block diagram of a system including one or more networks configured to operate according to various principles described herein.

FIG. 2 shows a system including one or more networks configured to operate according to various principles described herein. As shown in FIG. 2, a first (primary) ring of networked elements 201 includes a root node 205, which may comprise a PLC or other networked device. The ring also includes a first dual-ring switch 206, which couples the primary ring to a second (secondary) ring of networked elements 202 (left side of FIG. 2). The dual-ring switch permits packets originating from a network element on one ring (e.g., ring 201) to be transmitted to a network element on another ring (e.g., ring 202). The primary ring also includes dual-ring switch 207, which couples primary ring 201 to secondary ring 202, as well as dual-ring switches 208 and 209, which couple primary ring 201 to a third secondary ring 203, and dual-ring switch 210, which couples primary ring 201 to a fourth secondary ring 204.

In certain embodiments, primary ring 201 is configured and managed according to STP or RSTP, allowing ring 201 to automatically detect and repair network links as is well known. For convenience, the dual-ring switches 206 through 210 are labeled with both sides of the rings to which they couple (e.g., dual-ring switch 206 is labeled with both RSTP2, corresponding to ring 202, and RSTP1, corresponding to ring 201.)

Also as shown in FIG. 2, secondary ring 202 includes three dual-port switches 211, 212, and 213. Although not explicitly shown, each switch may be coupled to one or more devices (e.g., sensors or controllers) for the purpose of performing one or more functions in an industrial automation system using packets that are transmitted among the networked devices shown in FIG. 2. Similarly, secondary ring 204 includes dual-port switches 217, 218 and 219, and secondary ring 203 includes dual-port switches 214, 215, and 216.

In accordance with STP or RSTP protocols (or one of their variants), certain ports on some of the switches shown in FIG. 2 are blocked (set to inactive) in order to prevent cycles in the rings. In FIG. 2, blocked ports are shown by hash marks 220 (on dual-port switch 212), hash marks 221 (on dual-port switch 215), hash marks 222 (on dual-port switch 219), and hash marks 223 (on dual-ring switch 207).

According to certain embodiments, root node 205 periodically transmits a loop check message around ring 201 to determine whether the loop integrity is intact. If the packet traverses the ring and returns to root node 205 within a predetermined time period, the loop is deemed to be intact, and an indicator may be set to indicate that condition. If the packet does not return to the root node 205 within the predetermined time period, root node 205 may deem the loop to be broken, and an indicator may be set to indicate that condition.

The root node may comprise a PLC, and the indicator may comprise a bit or other data storage unit in a memory of the PLC. The indicator may also be monitored and reported at an application layer in the PLC, such that a human-readable error message, display screen, or other type of indication (e.g., an email or pager message) is provided.

Figure 3:
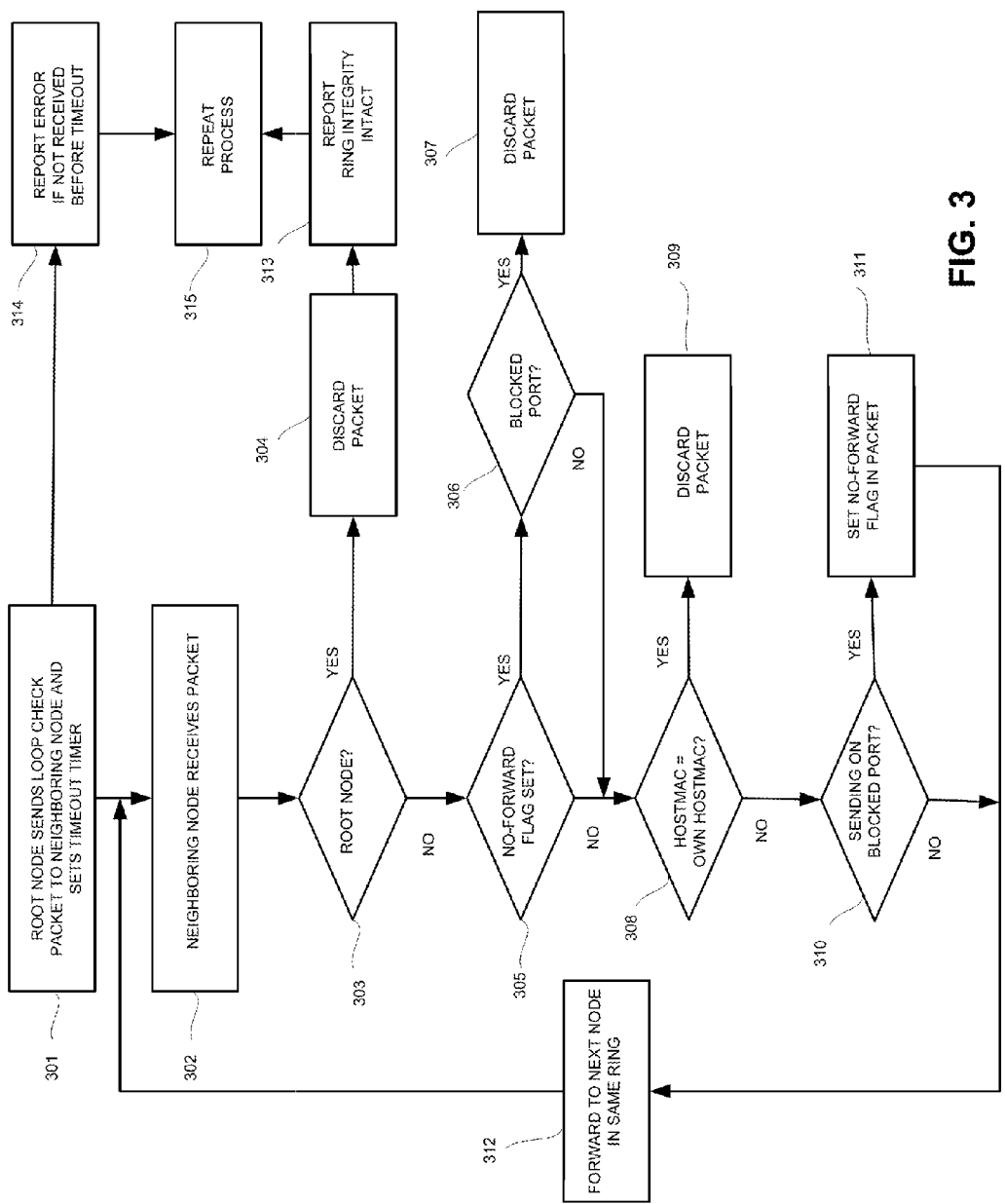
FIG. 3 is a flowchart showing various steps or functions that may be performed according to various principles described herein.

FIG. 3 shows various steps and functions that may be performed to carry out a process to diagnose and report a cable break or other network defect. These steps may be implemented in software, hardware, firmware, or a combination of these. Software instructions may be embodied in tangible readable media, such as a memory, and executed by one or more processors or other computing devices. Such instructions may be stored in any of various devices, such as those shown in FIG. 2. One or more processors and memories may be used to perform any or all of the steps and functions shown in FIG. 3.

Beginning in step 301, the root node (e.g., node 205, which may be a PLC) sends a loop check packet to a neighboring node in the primary ring and sets a timeout timer for receipt of the loop check packet back at the root node. The timeout timer may be set for any value that is reasonable for the size and configuration of the network, or it may be set to a default value. For example, depending on the number of nodes the packet must traverse, an assumption can be made about the longest time it would take to traverse the ring and return to the root node. Alternatively, a default value can be chosen that is larger than the longest time for traversal in the largest possible ring.

In some variations, the loop check packet is sent using a multicast destination MAC address. In one variation, the destination MAC address of the loop check packet is fixed at 01:80:63:07:00:0A (Hex). All nodes on the ring may register to receive this packet.

In some embodiments, the packet is not transmitted to the secondary rings (e.g., through the dual-ring switches) but instead only traverses the primary ring. For example, root node 205 transmits the loop check packet only to the RSTP1 port of dual-ring switch 206, not to the RSTP2 port of dual-ring switch 206. In some other embodiments, separate loop checks may also be conducted on secondary rings. One possible format for a loop check message is shown in FIG. 4, which is explained in more detail below.

Each node in the ring receives the packet and may manipulate the packet in various ways. In step 302, the neighboring node (e.g., dual-ring switch 210 in FIG. 2) receives the packet. In step 303, if the root node is the one receiving the packet (i.e., the packet has traversed the ring and returned to the root node), then in step 304 the packet is discarded and, in step 313, the ring integrity is reported to be intact, assuming that the timeout time had not expired by the time the packet was received (step 314).

The ring integrity reporting (whether success or failure) may be performed in any of various ways. In some embodiments, an indicator light (green for success, red for failure) may be provided. In other embodiments, an error message may be generated at an application level in a networked device, such as a PLC. The PLC may take further action based on the report, such as transmitting an email, a pager alert, an automated phone call, or other electronic notification techniques. The error may also be logged in a database and/or reported to other applications in the PLC or other devices.

In step 305, a check is made as to whether a "no-forward flag" has been set in the loop check packet. If the no-forward flag is set, a check is made in step 306 to determine whether the packet was received over a blocked port.

If in step 306 the loop check packet was received over a blocked port, then in step 307 the packet is discarded. This ensures that a message is only sent over a blocked port once, and prevents loops or cycles.

In step 308, a check is made to determine whether the HostMAC field in the loop check packet is the same as the HostMAC value of the node that received the packet. In an embodiment, use of the HostMAC field may determine if more than one root node exists. If there is a match, then in step 309 the packet is discarded. In an embodiment, the HostMAC address may be set by the originator of the loop check frame.

In step 310, a check is made to determine whether the packet is being sent on a blocked port. If the packet is being sent on a blocked port, then in step 311, the no-forward flag is set. This prevents the packet from being further forwarded a second time across a blocked port.

After steps 310 and 311, in step 312 the loop check packet is sent to the next node in the same ring, and the process returns to step 302.

If the timeout timer expires before the loop check packet is received back at the root node, then in step 314 an error report is generated. As explained above, the reporting may occur at an application level in a PLC, and may be communicated further via email or other means to a human or to an application program for further handling.

In step 315, the process may be repeated (i.e., returning to step 301) on an automated basis, such as one a two-minute interval.

FIG. 4 shows one possible format for a loop check frame. The values shown in FIG. 4 are in Hex. The invention is of course not limited to the particular values shown in FIG. 4.

Figure 5:
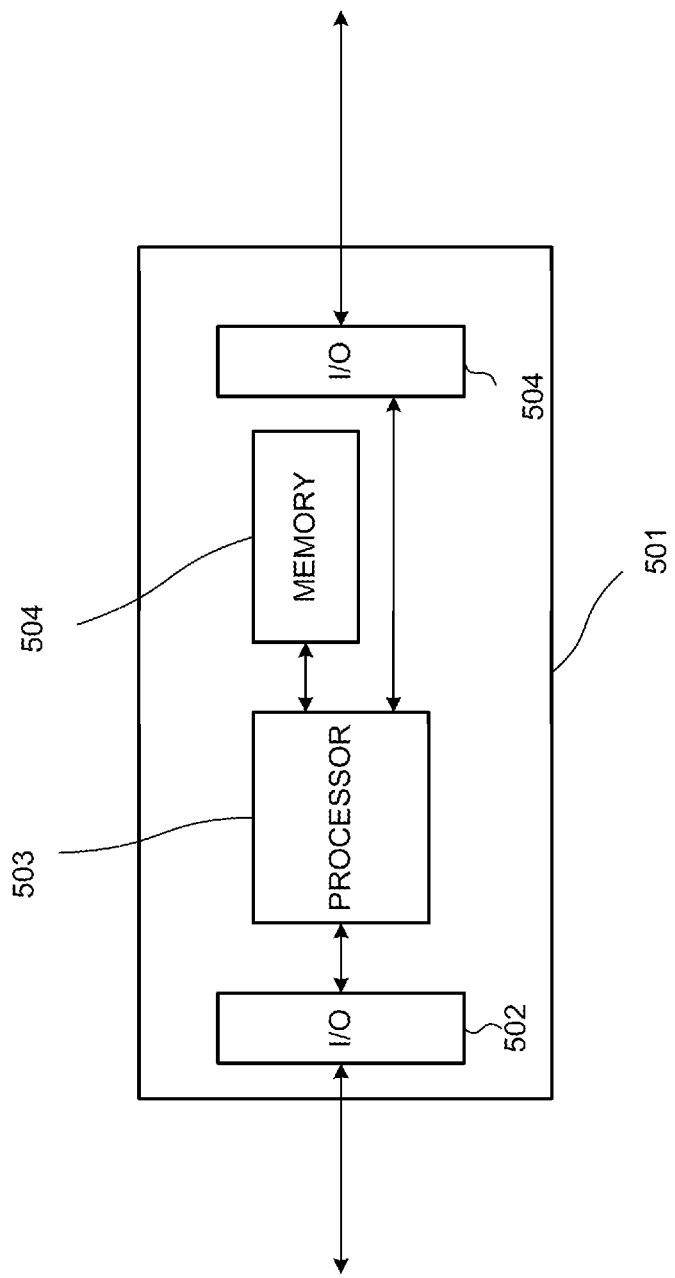
FIG. 5 shows a device that may be used to implement various functions described herein.

FIG. 5 shows an apparatus that can be used to implement devices such as those shown in FIG. 2. Device 501, such as root node 205 or dual-ring switch 206, may include one or more processors 503 and one or more memories 504 having stored therein instructions that perform the functions described above. The device may also include one or more I/O circuits 502 and 504 to communicate with other devices on the network through ports. References to a processor and memory are also intended to encompass various types of processing structures including, but not limited to, application-specific integrated circuits (ASICs) and field programmable gate arrays (FPGAs).

The functions and steps described above may be implemented by hardware and/or by software stored in tangible computer-readable media (e.g., a memory) and executed by various computing devices or apparatus, such as a server computer including one or more processors programmed with software.

The divisions between functional blocks in the figures are merely illustrative, and the physical division of computing devices and other equipment may be different from the functional division. Moreover, some or all of the functional blocks may be combined or further subdivided functionally and/or physically. For example, devices 102 and 103 could be combined into a single device, and even the functions of console 101 could be combined into a single device, such as an industrial PC.

Unless otherwise explicitly stated, steps of method claims (and corresponding functional elements) herein should not be limited to being performed in the order in which they are recited.

References to "spanning tree protocol" refer to and include not only standardized STP and RSTP, but other variations and modifications of such protocols. "Spanning tree protocol" should be understood to include a protocol that establishes and repairs a loop-free topology in a network of devices, such as Ethernet switches.

What is claimed is:

1. A method, comprising:
transmitting, from a root node in a network configured according to a spanning tree protocol, a packet to a neighboring node in the network;
determining, at a non-root node in the network, if a no-forward flag in the packet has been set and setting the no-forward flag if the packet is to be forwarded over a blocked port;
forwarding the packet to a next neighboring node in the network; and
reporting, when the packet is received back at the root node within a predetermined time period, that the network is intact or reporting, when the packet is not received back at the root node within the predetermined time period, that a break in the network has occurred.

2. The method of claim 1, wherein the spanning tree protocol is Rapid Spanning Tree Protocol.

3. The method of claim 1, wherein the packet has a multicast destination MAC address.

4. The method of claim 1, wherein at least one of a plurality of non-root nodes in the network forwards the packet over a blocked port.

5. The method of claim 1, wherein if a no-forward flag has been set, preventing further forwarding of the packet over a blocked port.

6. The method of claim 1, wherein if a HostMAC address in the packet matches a HostMAC address of the root node that sent the packet, the packet will be discarded.

7. The method of claim 1, wherein reporting that a break has occurred comprises generating an application-level message.

8. The method of claim 1, further comprising the step of repeating the steps on a periodic basis.

9. The method of claim 1, wherein the root node comprises a programmable logic controller (PLC) in an industrial automation system.

10. The method of claim 1, further comprising the step of preventing forwarding of the packet to a node located in a secondary ring.

11. An apparatus comprising:
a processor; and
a memory storing instructions that, when executed by the processor, cause the apparatus to:
receive a packet from a root node in a network configured according to a spanning tree protocol;
determine if a no-forward flag in the packet has been set;
set the no-forward flag if the packet is to be forwarded over a blocked port; and
forward the packet to a next neighboring node in the network.

12. The apparatus of claim 11, wherein the spanning tree protocol is Rapid Spanning Tree Protocol.

13. The apparatus of claim 11, wherein the packet has a multicast destination MAC address.

14. The apparatus of claim 11, wherein the apparatus is configured to forward the packet over a blocked port.

15. The apparatus of claim 14, wherein when the packet is forwarded over the blocked port, the apparatus sets a flag in the packet to indicate that it should not be further forwarded over another blocked port.

16. The apparatus of claim 11, wherein the apparatus is configured to determine whether the no-forward flag has been set in the packet and, if the no-forward flag has been set, prevent further forwarding of the packet over a blocked port.

17. The apparatus of claim 11, wherein the apparatus is configured to discard the packet if a HostMAC address in the packet matches a HostMAC address of the apparatus.

18. The apparatus of claim 11, wherein the root node comprises a programmable logic controller (PLC) in an industrial automation system.

19. A non-transitory computer-readable medium having stored thereon instructions that, when executed, cause an apparatus to:
  receive a packet from a root node in a network configured according to a spanning tree protocol;
  determine if a no-forward flag in the packet has been set;
  set the no-forward flag if the packet is to be forwarded over a blocked port; and
  forward the packet to a next neighboring node in the network.

\* \* \* \* \*